United States Patent [19]

Henderson

[11] 4,222,785

[45] Sep. 16, 1980

[54] BUILDING MATERIAL

[76] Inventor: Eugene R. Henderson, 3502 Alameda, Baltimore, Md. 21218

[21] Appl. No.: 968,627

[22] Filed: Dec. 11, 1978

[51] Int. Cl.$^2$ ................................................ C04B 7/02
[52] U.S. Cl. ....................................... 106/97; 106/98; 106/DIG. 2
[58] Field of Search ....................... 106/97, 98, DIG. 2

[56] References Cited

U.S. PATENT DOCUMENTS

| | | | |
|---|---|---|---|
| 2,585,366 | 2/1952 | Bollaert et al. | 106/98 |
| 3,203,813 | 8/1965 | Gajardo et al. | 106/DIG. 2 |
| 4,031,684 | 6/1977 | Shibata | 106/98 |

Primary Examiner—James Poer
Attorney, Agent, or Firm—Walter G. Finch

[57] ABSTRACT

The invention is an improved building material for constructing buildings, a building material which also has insulating qualities. The building material may be formulated as a mortar or as a concrete like composition. The materials consist of cement, regular fine aggregate, regular coarse aggregate, volcanic ash in coarse aggregate form, perlite in fine aggregate form, and water. The materials can be compounded in numerous formulations, a preferred formulation is provided. The prepared materials can be plastered or used as a binder in one case, and molded, paired in forms, or otherwise shaped in the other case.

12 Claims, No Drawings

BUILDING MATERIAL

BACKGROUND AND SUMMARY OF THE INVENTION

The invention relates to building materials and in particular to building materials that can be made into a mortar or into a concrete-like composition. Specifically, it relates to building materials that have insulating characteristics, use in plaster and binder mixtures, and in concrete-like compositions.

A need has existed for a building material consisting of easily obtainable materials, materials that can be easily compounded and placed, and a material that had a wide variety of uses with both construction and insulating qualities. This invention provides that building material.

In the prior art various inventions have used some of these same ingredients for compounding materials for other purposes or in different formulations of a portion of the ingredients.

Because of the energy shortage, most homes and apartments have been forced to use electric heating. Since this is true, conventional building materials, even with insulation, batts tend to lose heating and cooling through the walls. Based on experience over the past twenty years or so, this problem has increased. The cost of electric heat has worked a hardship on most families, homeowners and renters, where they have to pay their own utility bills.

With this in mind, it was decided to try to work out a solution to the problem by developing a type of building material that would not transmit heat and cold and thereby retain both so that the cost of the utilities could be drastically reduced.

In experimentation, many types of materials were used. Finally, a building material composition was developed by the present inventor that will accomplish the above.

A new composition of ingredients has been developed which, when made up properly, will resist an acetylene cutting torch and would not deteriorate or heat up under those conditions.

It is, therefore, an object of the invention to provide a building material having construction qualities.

It is also an object of the invention to provide a building material that has insulating characteristics.

It is another object of the invention to provide a building material that uses certain available materials for economic considerations.

It is another object of the invention to provide a building material that has light weight characteristics.

It is still another object of the invention to provide a building material that can be compounded and used as a mortar.

It is yet another object of the invention to provde a building material that can be molded or formed into various configurations.

It is yet still another object of the invention to provide a building material that can be packaged dry for do-it-yourself projects.

Further objects and advantages of the invention will become more apparent in the light of the following description of the preferred embodiments.

DESCRIPTION OF THE PREFERRED EMBODIMENTS

The building material of this invention consists of compounding the following ingredients: cement, regular fine aggregate, regular coarse aggregate, volcanic ash in coarse aggregate size, perlite in fine aggregate size, and water. The proportions of each are covered hereinafter.

The aforegoing ingredients are those as compounded for the building material when used as a concrete-like mixture for molding or otherwise forming the material into some shape.

When the ingredients are to be compounded for a building material to be used as a mortar, the volcanic ash in coarse aggregate size is omitted.

The volcanic ash is the raw volcanic matter from volcano eruptions that is crushed and reduced to a size of approximately one-quarter of an inch to three-eighths of an inch in diameter. It is to be understood that variation from the size above is within the scope and intent of this invention.

The perlite is a volcanic glass that is reduced to a fine size like ordinary sand. It is to be understood that variation of the grains of the perlite from very fine to very course is within the scope and intent of this invention.

The cement is Portland cement known in the art. The regular fine aggregate is ordinary sand as used in the prior art for mortars and concretes. The regular course aggregate is ordinary crushed stone or gravel as used in the prior art for concretes of various compositions.

It is to be noted that any variation in the grain size of the regular fine aggregate is within the scope and intent of this invention.

The regular course aggregate may vary in size, however, a size of one-quarter on an inch to three-eighths of an inch in diameter is preferred. It is to be noted that any variation in this preferred size is within the scope and intent of this invention.

In the use of water when compounding a mortar or a concrete, the water per sack of cement (or per each part of cement in a formulation) is to be kept as low as possible as long as the mixture is workable. Excessive water per sack of cement is to be avoided. Water content of the other materials is to be taken into account in determining the amount of water to add during the compounding and mixing process. The water per sack of cement (or part of cement) recommendations of the Portland Cement Association are to be followed. The water is to be hot when added instead of using cold water. A slight initial foaming reaction will be noticed as the process is initiated. This aids in the initial mixing and coating of each fine and coarse aggregate with cement paste. It is to be noted that the use of cold water, while not recommended in the preferred embodiment, is within the scope and intent of the invention.

The ingredients, for a mortar or concrete mix as hereinafter described, except the water, may be added in any sequence and then dry mixed until the compound is more or less homogeneous. At that point the water is added and the mixing continued until all particles are thoroughly mixed and in a homogeneous state. With such mixing each particle will be covered with a cement paste coating which, when cured, will bond it to the adjacent particles.

As previously pointed out, the water per sack (or part) of cement is to be kept to minimum in relation to workability of the mass. Excessive water will weaken the strength and wearing qualities of the end product. The reaction of the cement and the water is a chemical reaction that takes place that ends wih the hardening of the cement as the chemical reaction is completed.

The addition of the volcanic ash and the perlite will give the end products and insulating characteristic to conserve energy and also make the end product light in weight for easy handling.

In the mortar form the mixture can be used to bind bricks or blocks together to form walls, or can be used as a plaster which can be white coated for the finished interior walls. Because of the insulating qualities, it is recommended as a plaster for the inside of exterior walls.

In the concrete form the mixture can be molded into bricks, building blocks (hollow or solid), or any other confirguration. The bricks or building blocks from the latter mixture can also add an insulating value to the exterior walls where they are used.

The finished products can also withstand the heat of a blow torch or an acetylene torch without any observable damage as is the case with other similar, but not equivalent end products.

The economics of this building material is enhanced by the availability of volcanic ash and perlite in nearly locations in the United States.

Care should be taken in curing the end products. They may be cured in air or water (after final set) for at least seven days, perferably longer. The drying process for curing should not be rushed.

As to the formulation, for building products or building structures requiring the concrete mix, the ingredients should be compounded by volume as follows: one part cement, two parts regular coarse aggregrate, two parts perlite, in fine aggregate consisting, volcanic ash in coarse aggregate consistency, and water in a quantity per sack of cement (or part of cement) according to the Portland Cement Association recommendations (the water si to be hot).

For the formulation for a mortar, the ingredients should be compounded by volume as follows: one part cement, four parts regular fine aggregate, two parts perlite in fine aggregate consistency, two parts volcanic ash in fine aggregate consistency, and water in a quantity per sack of cement (or part of cement) according to the Portland Cement Association recommendations (the water is to be hot). It is to be understood that formulations varying from the above preferred embodiment are within the scope and intent of the invention.

The formulations for both the concrete-type mix and the mortar-type mix may be mixed dry and packaged for do-it-yourself projects when the hot water will be added at the time of use.

Accordingly, modifications and variations to which the invention is susceptible may be practiced without departing from the scope and intent of the appended claims.

What is claimed is:

1. A building material compounded from and consisting of:
   one part of cement;
   a first aggregate consisting of two parts of sand;
   a second aggregate consisting of four parts of a coarse aggregate;
   a third aggregate consisting of two parts of perlite;
   a fourth aggregate consisting of four parts of ash.

2. A building material compounded from and consisting of:
   one part of cement;
   a first aggregate, said first aggregate being a fine aggregate, said first aggregate being two parts of sand;
   a second aggregate, said second aggregate being two parts of perlite;
   a third aggregate, said third aggregate being four parts of volcanic ash.

3. The building material as recited in claim 1, wherein said cement is Portland cement.

4. The building material as recited in claim 1, wherein said perlite is of a similar consistency of said first aggregate.

5. The building material as recited in claim 1, wherein said volcanic ash is of a similar consistency of said second aggregate.

6. The building material as recited in claim 1, wherein said water is at an elevated temperature.

7. The building material as recited in claim 2, wherein said cement is Portland cement.

8. The building material as recited in claim 2, wherein said perlite is of a similar consistency of said first aggregate.

9. The building material as recited in claim 2, wherein said volcanic ash is of a similar consistency of said first aggregate.

10. The building material as recited in claim 2, wherein said water is at an elevated temperature.

11. A building material compounded and formulated dry, for packaging, from and consisting of:
    one part cement, said cement being Portland cement;
    two parts of a first aggregate, said first aggregate being a fine aggregate, said first aggregate being sand;
    four parts of a second aggregate, said second aggregate being a coarse aggregate, said second aggregate being a stone material;
    two parts of a third aggregate, said third aggregate being of a consistency similar to said first aggregate, said third aggregate being perlite;
    four parts of a fourth aggregate, said fourth aggregate being of a consistency similar to said second aggregate, said fourth aggregate being volcanic ash.

12. A building material compounded and formulated dry, for packaging, and from and consisting of:
    one part cement, said cement being Portland cement;
    four parts of a first aggregate, said first aggregate being a fine aggregate, said first aggregate being sand;
    two parts of a second aggregate, said second aggregate being of a consistency similar to said first aggregate, said second aggregate being perlite;
    two parts of a third aggregate, said third aggregate being of a consistency similar to said first aggregate, said third aggregate being volcanic ash.

* * * * *